No. 773,285. PATENTED OCT. 25, 1904.
F. GOEDECKE.
DEVICE FOR UTILIZING THE POWER OF UNDULATIONS OF WAVES OF THE SEA.
APPLICATION FILED MAY 7, 1904.
NO MODEL.
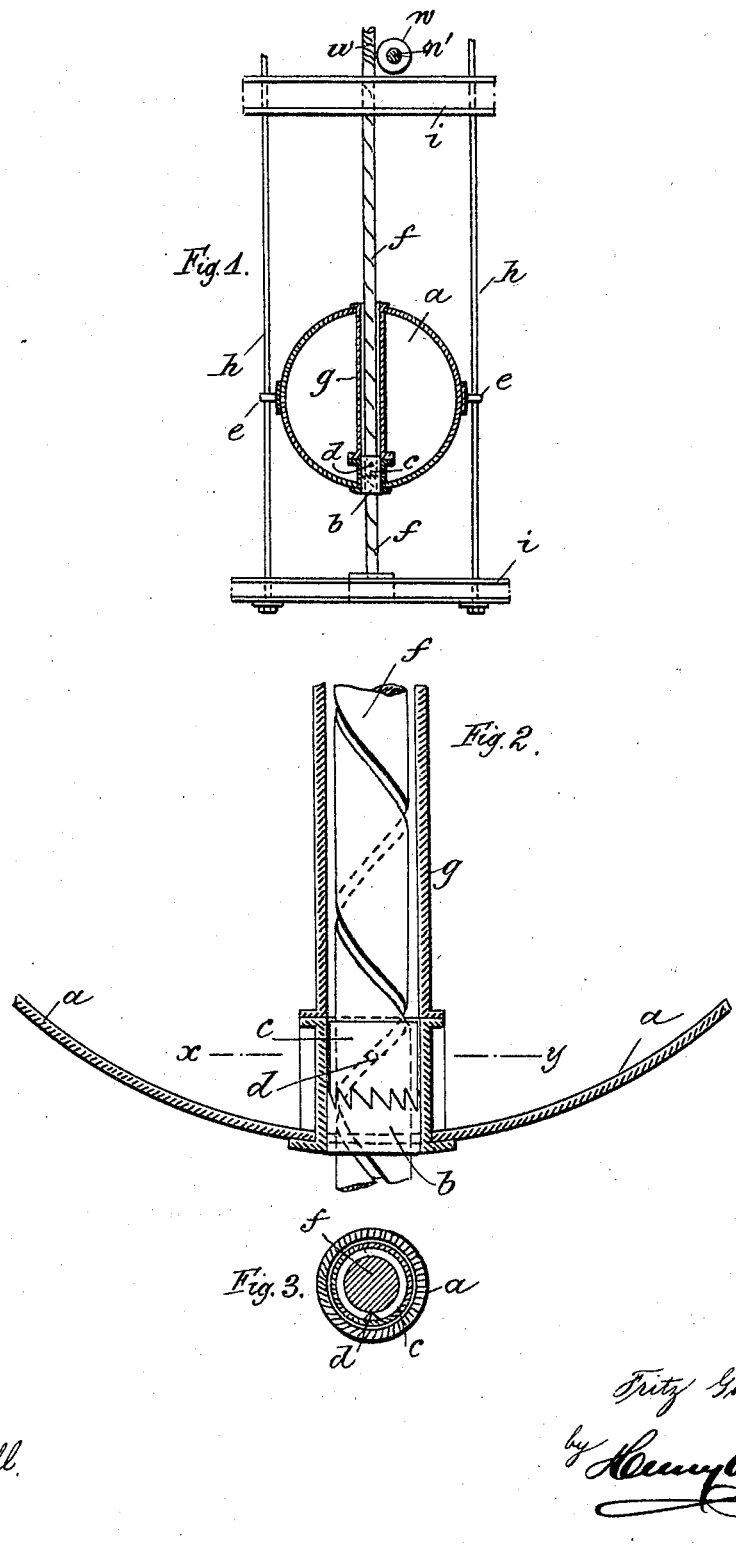

No. 773,285. Patented October 25, 1904.

UNITED STATES PATENT OFFICE.

FRITZ GOEDECKE, OF TELTOW, NEAR BERLIN, GERMANY.

DEVICE FOR UTILIZING THE POWER OF UNDULATIONS OF WAVES OF THE SEA.

SPECIFICATION forming part of Letters Patent No. 773,285, dated October 25, 1904.

Application filed May 7, 1904. Serial No. 206,876. (No model.)

*To all whom it may concern:*

Be it known that I, FRITZ GOEDECKE, chief gardener, a subject of the King of Prussia, Emperor of Germany, residing at Teltow, near Berlin, in the Kingdom of Prussia and Empire of Germany, have invented certain new and useful Improvements in Devices for Utilizing the Power of the Waves of the Sea, of which the following is a specification.

This invention relates to wave-motors or devices for the utilization of the power produced by the undulations of waves of the sea; and it consists of a vertically-movable float to drive in one direction a screw-spindle, with details of construction hereinafter specified.

Referring to the drawings, in which like parts are similarly designated, Figure 1 is an elevation of the device, partly in section. Fig. 2 is a partial vertical section showing the actuating parts on a larger scale, and Fig. 3 is a section on line *x x*, Fig. 2.

The device comprises a frame composed of cross-pieces *i*, of iron or other suitable material, connected by rods or guides *h*. In the frame is journaled a screw-spindle *f*, having a thread of high pitch to be rotated in one direction and from which any suitable mechanism is driven in any desired manner and here shown, for example, as a worm *w*, driving a worm-wheel *n* on a shaft *n'*.

On the screw-spindle *f* is a hollow body or ball *a*, provided with a central tube *g*, surrounding the spindle, and with eyes *e*, through which the rods *h* pass. At the lower end of the tube *g* is a clutch element *b*, having teeth at its upper end that engage complementary teeth on a sleeve *c*, surrounding the spindle and free to move thereon. One or more pins *d*, fixed in the sleeve *c*, take into the groove of the spindle *f*.

The frame is secured in the water, and the ball floats on its surface. The waves lifting the ball cause the lower clutch element to engage the teeth on the sleeve *c*, thereby preventing this sleeve from rotating, while the vertical movement of the ball and sleeve will cause the spindle *f* to rotate by reason of pin or pins *d* moving vertically in a straight line. When the ball descends, the clutch element *b* is disengaged from the sleeve *c*, and the latter is free to rotate as it descends, being guided by the pin *d* in the thread in spindle *f*.

Having thus described my invention, what I claim as new therein, and desire to secure by Letters Patent, is—

1. The combination with a screw-spindle, of a float guided to move vertically, a clutch, and a sleeve on the spindle adapted to be engaged by the clutch and drive the spindle, substantially as and for the purposes set forth.

2. The combination with a screw-spindle, of a float guided to move vertically, a clutch element secured to the float, a sleeve on the spindle and a pin fixed in the sleeve to engage the thread of the screw-spindle, whereby said spindle will be rotated when the float is lifted, substantially as and for the purposes set forth.

3. The combination with upright supporting-rods and a spindle having a helical groove therein; of a ball-float having a central tube surrounding the spindle, eyes on the float through which the rods pass, a clutch member in the tube, a loose sleeve to be engaged by the clutch member and held against rotation and a pin fixed in the sleeve and projecting into the helical groove in the spindle, substantially as and for the purposes set forth.

In witness whereof I have hereunto set my hand in presence of two witnesses.

FRITZ GOEDECKE.

Witnesses:
 WOLDEMAR HAUPT,
 HENRY HASPER.